INVENTOR
Herbert W. Volker,
BY
ATTYS.

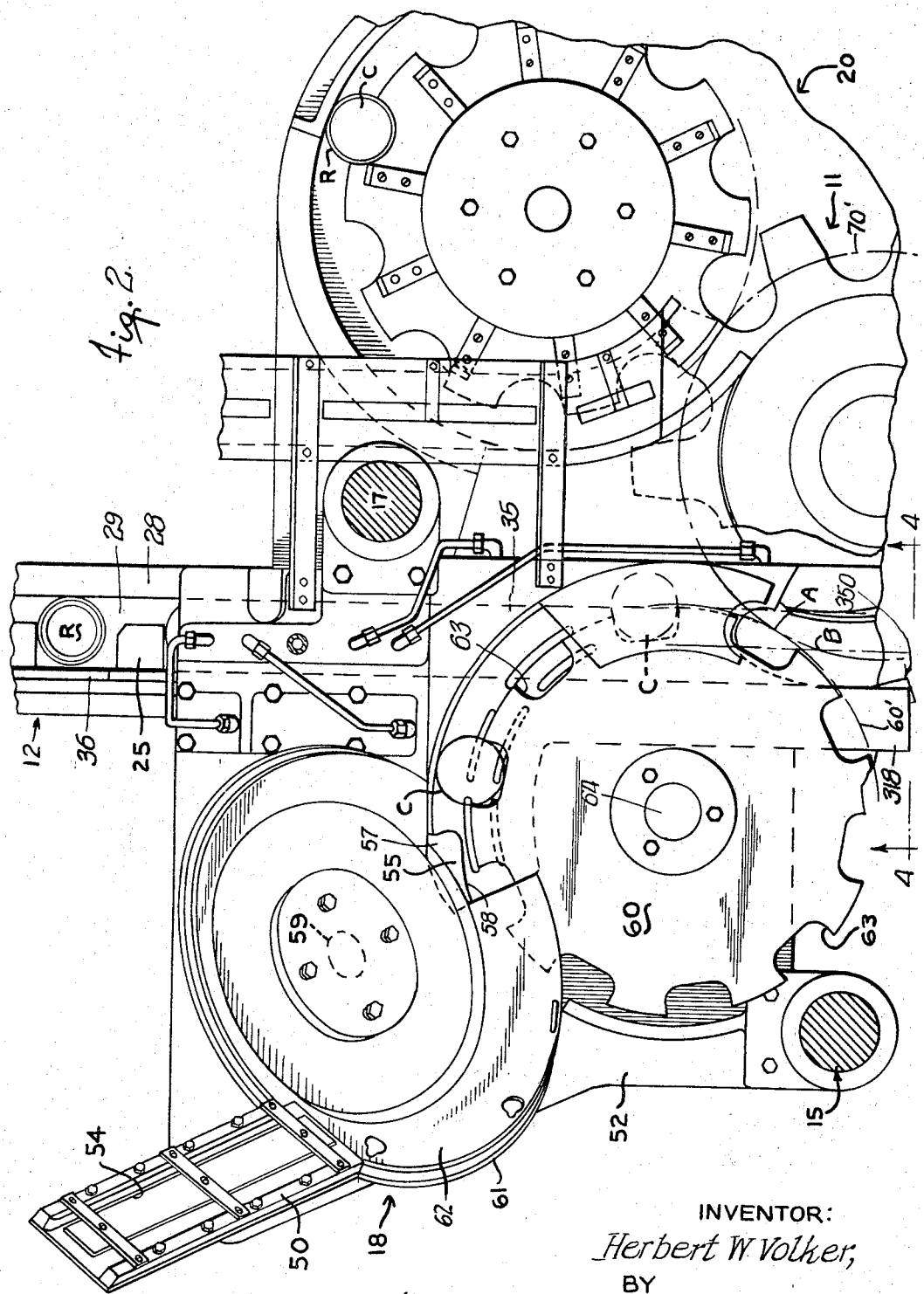

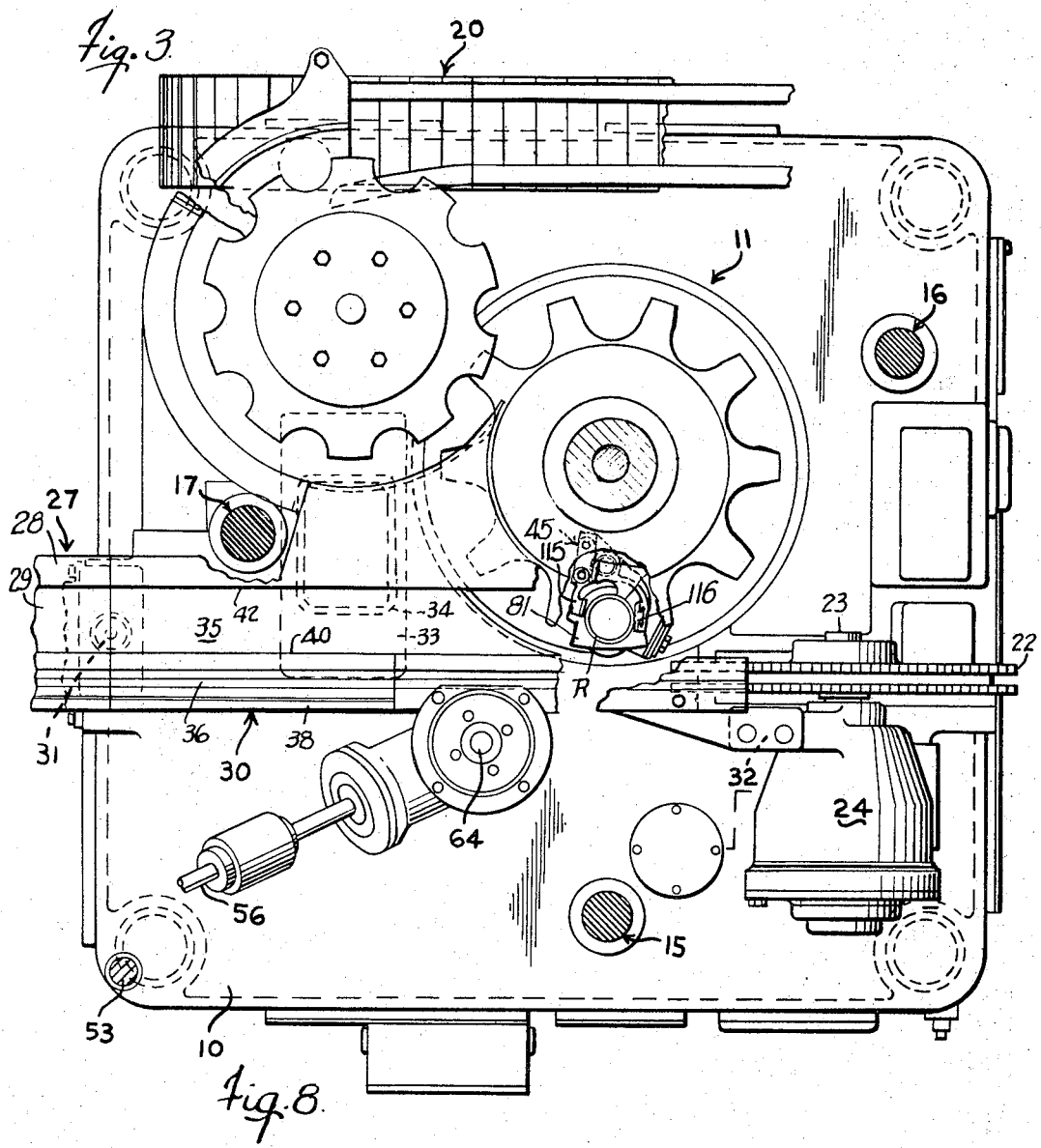

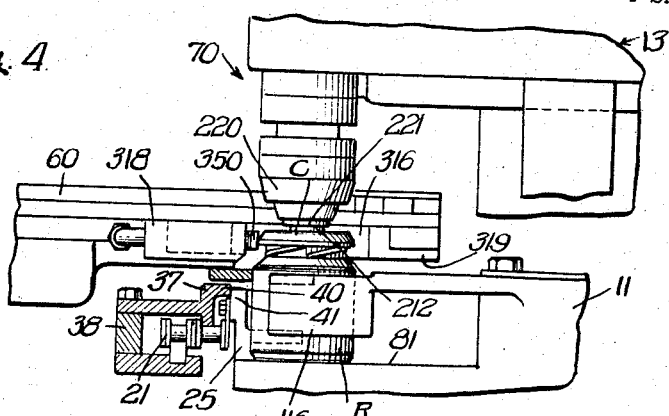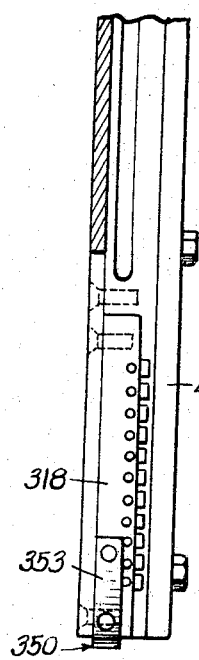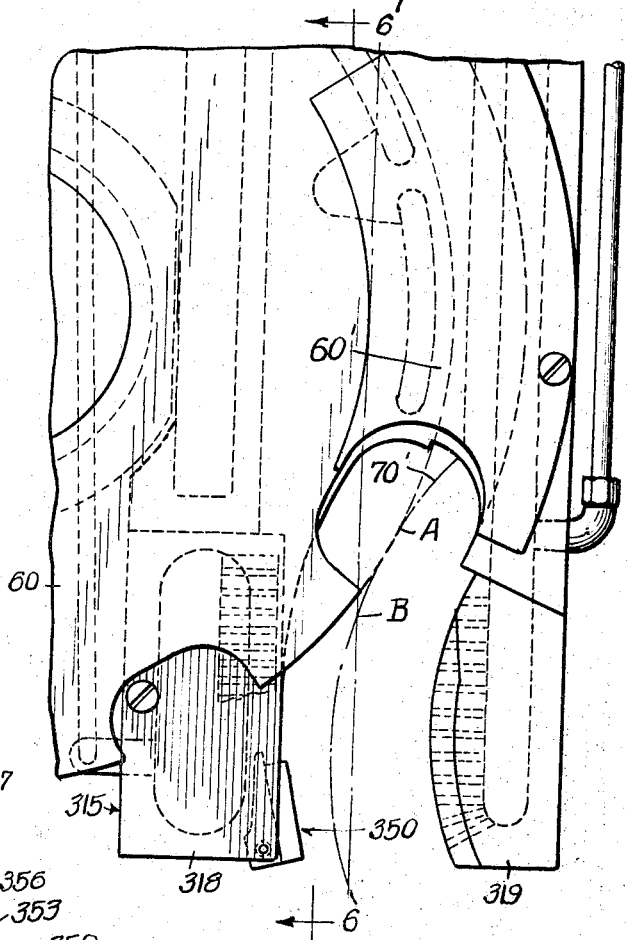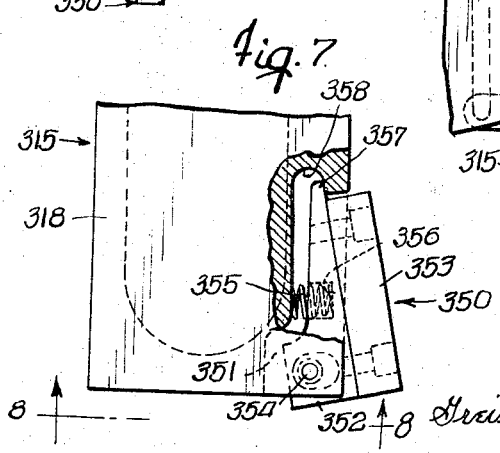

United States Patent Office 3,345,800
Patented Oct. 10, 1967

3,345,800
ROTARY JAR CAPPING MACHINE
Herbert W. Volker, Naperville, Ill., assignor to Continental Can Company, Inc., New York, N.Y., a corporation of New York
Filed Apr. 19, 1965, Ser. No. 449,232
10 Claims. (Cl. 53—303)

This invention relates to machinery for applying closures to containers and is more particularly concerned with improvements in a machine for automatically applying screw-on or turn-on closure caps to the tops of jars or similar containers and thereafter turning the caps into tight sealing relation on the jar.

In the commercial processing and packaging of food products and other commodities in glass jars or similar containers with which screw threaded caps are used for closing and sealing the containers, various types of cap applying and closing machinery has been employed. In one such machine which has been employed, the filled containers are delivered on a straight line conveyor to a turret which carries the containers in a circular path while the caps are placed thereon and screwed down to sealing position with the capped containers being transferred from the turret to another straight line conveyor which removes them from the machine. In this type of machine, the caps are applied and rotated into screwed down sealing position by a series of cap applying and sealing head or spindle assemblies which are mounted on the turret and which travel with the jars as they move in a circular path about the same. A machine of this type is illustrated and described in application Ser. No. 253,-895, filed Jan. 25, 1963, now Patent No. 3,253,388, which employs a relatively small turret for receiving the filled jars from a processing line and a relatively small number of cap applying heads or spindles traveling with the turret, the spindles being operable for high speed application and rotation of the caps into sealing position and having provision for tightening the caps on the jars at a slower speed under conditions which permit accurate control of the tightening force on the cap so as to apply the caps to successive jars with a uniform torque. The jars are delivered to this machine in a straight line and continue on a straight line path until they intersect the pitch diameter of the sealing turret on a chordal path, the cap being placed on the jar and rapidly turned or spun down into engagement with the screw threads before the jar has left its straight line path so as to seat the cap fully on the jar as the jar enters the circular path and before it is subject to sufficient centrifugal force to cause the contents to spill out of the jar top. The jars are delivered in this machine to a rotating turret on which the caps are applied and rapidly turned or spun down into sealing relation by heads carried on the turret which include a magnet for gripping the caps with the cap being delivered to the sealing heads and carried in a circular path while they are placed on the jar tops and engaged with the screw threads thereon, the jars being advanced at the point of entry to the turret on a straight line path while the cap is being applied and spun or screwed down, and the caps being tightened by slow rotation while the jars are carried in a circular path with the cap and the jar at all times under full control of the machine. The cap applying and turning heads on the turret each have two independently driven spindles with one thereof, to which the cap is initially delivered, being rotated at high speed for placing the cap on the jar and rapidly rotating it to spin it down into fully engaged position and the other spindle being operated at relatively slow speed and engaging the cap so as to tighten it to a preset torque with the jar being gripped on the turret and held against rotation during rotation of the spindles. In the operation of this machine, it has been found that on occasion a cap is prevented from spinning down on the glass thread after it is picked up by magnetic attraction and held on the bottom face of the high speed rotating spindle. This may be due to excessive friction between the glass finish and the cap so that this friction is greater than the friction force between the cap and the magnetic spindle or the glass thread design may be such as to permit the cap lugs and glass thread to collide which can delay or even stop the cap from spinning, or possibly a shallower thread angle may offer more resistance to the cap spinning. When this occurs, the cap is forced vertically over the threads, due to the lowering action of the spindle, with the result that the cap lugs are deformed or crushed and a defective package is produced. This malfunctioning of the machine has reduced its efficiency and the need for an improvement which will eliminate or minimize the production of defective packages due to cap damage at the point of application of the cap has been recognized. Therefore, it is an object of the present invention to provide in the type of machine described, a means for supplementing the turning action of the cap applying spindle after the caps are initially positioned and normally spun down on the container mouth for insuring that any balky caps will be started turning so as to effect proper engagement of the lugs with the glass thread and subsequent proper seating of the cap on the mouth of the container by the cap applying spindle, thereby minimizing the possibility of cap damage.

It is a more specific object of the invention to provide in a rotary jar capping machine of the type having cap applying and turning heads mounted on a jar supporting turret with the heads having cap applying spindles rotating at high speed to which the caps are initially delivered from a straight line infeed conveyor, a spring loaded rocker bar having a friction pad attached to a side facing in the path of the caps which makes contact with the side of the caps after the magnetic spindle has placed the caps on the jars and has normally spun them down so as to assist the magnet with sufficient side friction to develop the required application torque for initiating the turning of any balky caps so that the magnetic spindle will thereafter take over and spin the balky caps fully down.

These and other objects and advantages of the invention will be apparent from a consideration of the apparatus which is shown by way of illustration in the accompanying drawings wherein:

FIGURE 2 is a horizontal section taken on the line 2—2 of FIGURE 1, to an enlarged scale and with portions broken away;

FIGURE 3 is a horizontal section taken on the line 3—3 of FIGURE 1 to an enlarged scale, with portions being broken away and with other portions omitted;

FIGURE 4 is a fragmentary vertical section taken on the line 4—4 of FIGURE 2, to an enlarged scale;

FIGURE 5 is a fragmentary horizontal section taken on the same plane as FIGURE 2 to a larger scale;

FIGURE 6 is a fragmentary vertical section taken on the line 6—6 of FIGURE 5;

FIGURE 7 is a detail view to an enlarged scale showing the drag bar and its mounting; and FIGURE 8 is a view taken on the line 8—8 of FIGURE 7.

Figure 1:
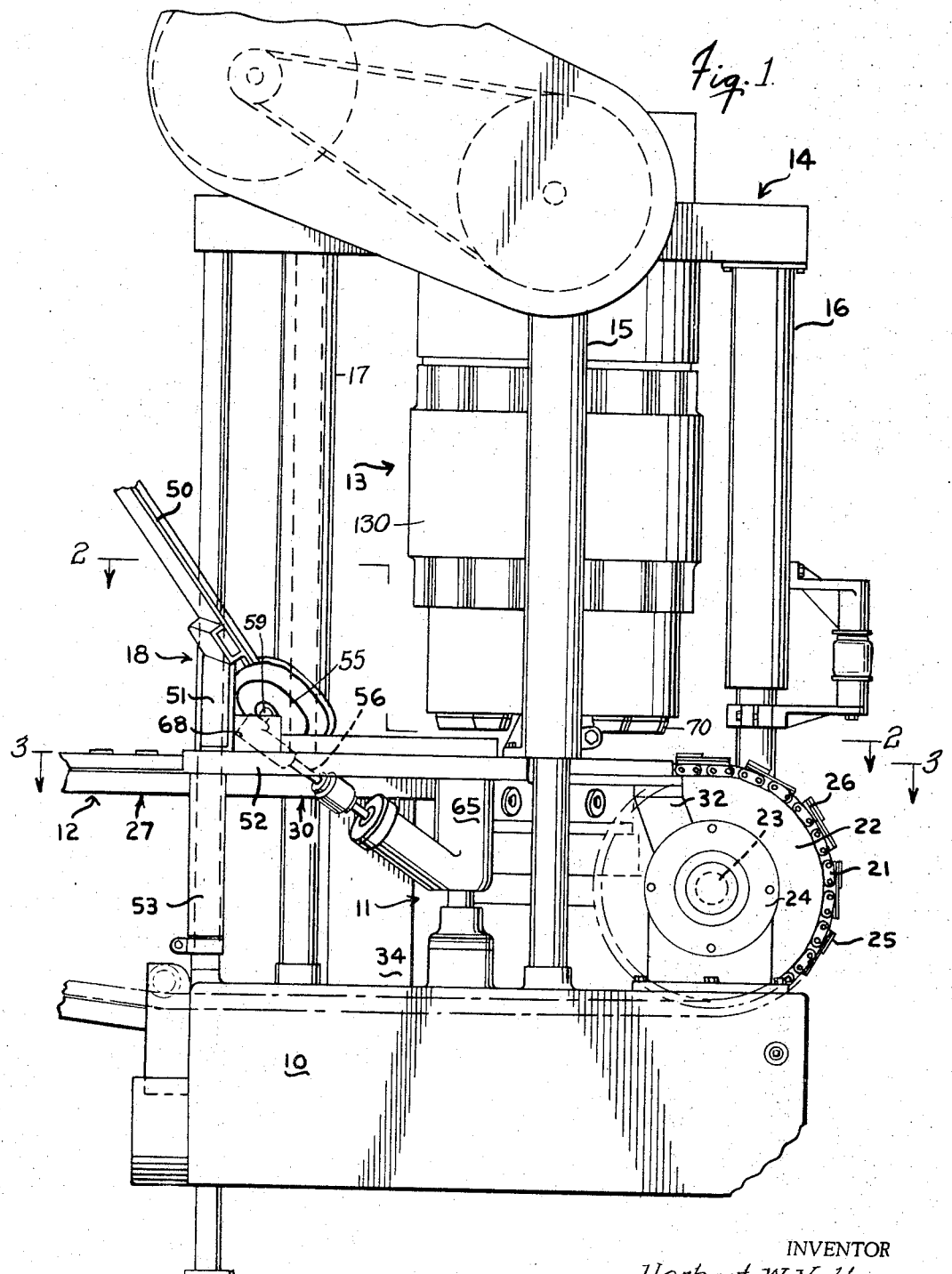
FIGURE 1 is a side elevation of a rotary jar capping machine which embodies therein the principal features of the invention, portions of the machine being broken away or omitted.

The capping machine which is illustrated in part in the drawings, is adapted to be employed in a canning processing line and is designed to apply screw-on or turn-on type closure caps C to containers or receptacles, such as glass jars R, which have been filled with a product and delivered to a traveling infeed conveyor for the capping machine. The machine is constructed as described in copending application Ser. No. 253,895, now Patent No. 3,253,388 to which reference may be had for details of the various parts of the machine which are hereinafter referred to but not fully described. The present description will be limited to the improvement on the prior machine and only such details of the prior machine will be described as are necessary for an understanding of the improvement which constitutes the present invention.

The capping machine comprises a base support 10 (FIGURES 1 and 3) which houses the major portion of the driving gear mechanism and which supports a jar carrying turret 11 to which the jars R are delivered by the infeed conveyor 12. The jar carrying turret 11 is disposed below a cap applying head 13 which is suspended from a top drive housing 14, with the latter being mounted in vertically adjustable position on three main post assemblies 15, 16 and 17, which post assemblies are upstanding from the base 10 and arranged generally in triangular relation thereon. A cap feeding and delivering or transfer apparatus 18 is also supported on the base 10 at one side of the jar supporting turret 11 at the proper level for delivering caps C from a supply magazine or chute to the applying head 13 while the jars R are delivered to the turret 11 for alignment of the caps and jars and the application of the caps to the jars which is accomplished before the jars are transferred from the straight line path of the conveyor 12 to the circular path traversed by the turret 11. The caps C are applied to the jars R, tightened during rotation of the turret 11 and the head 13, and the capped jars are delivered to a discharge mechanism 20 (FIGURE 3) which removes them from the machine, there being, of course, a continuous flow of the jars R and caps C through the machine while it is operating.

The jar infeed conveyor 12 includes an endless double chain carrier 21 which has one end supported on a double plate sprocket 22 mounted on a stub shaft 23 journaled in an upstanding housing 24 on the base 10. The upper run of the conveyor 12 which feeds the jars R into the machine is in a generally horizontal plane at the proper elevation above the base 10 to deliver the jars to the jar supporting or carrying turret 11. The chain 21 carries a series of U-shaped jar forwarding or pusher members 25, each of which is attached to the chain 21 by a vetically extending link plate 26 so that it is open on the side facing the turret 11. The upper run of the jar infeed conveyor 12, as it approaches the machine, is carried on a chain guiding and jar support structure indicated at 27 (FIGURES 1 and 3) which includes a horizontally disposed bottom plate 28 and wear plate 29 on the top thereof on which the jars R and pushers 25 slide. As the chain 21 moves into the capping machine, the chain 21 and the jars R are supported and guided on a suitable frame structure or guide assembly 30 which is supported at one end on the top of a vertical post 31 which extends above the base 10. The post 31 also supports the end of the conveyor frame structure 27. At its other end the guide assembly 30 is attached to an upstanding bracket 32 on the gear housing 24. The guide assembly 30 is supported intermediate its ends on a flat plate 33 on the top of an upstanding column 34 on the base 10. The guide assembly 30 comprises a horizontally disposed base plate 35 which is aligned with the bottom plate 28 of the infeed conveyor support frame 27 and the wear plate 29 on which the bottoms of the jars rest as they are advanced by the movement of the chain 21. The chain 21 is guided by a longitudinally extending rail 36 which is set in the base plate 35 and support frame 27 and guides the chain 21 in a horizontal straight line across the machine. A guide member 37 for the jar pushers 25 is mounted in spaced relation above the base plate 35 and secured on a vertically disposed wall member 38 which extends along the outside edge of the base plate 35. The guide member 37 (FIGURE 4) is generally L-shaped in section with a rail forming flange 40 on which the flanges 41 on the pusher members 25 ride, guiding them in a straight path. A vertically disposed wall member 42 (FIGURE 3) is mounted in spaced relation opposite the guide rail 40 and provides one side of a guideway of the proper width for the jars R, the other side of the guideway being a rail member 43 extending along a steam chamber 315 (FIGURE 5) above the guide assembly 30. The guide assembly 30 extends to the turret 11 and the ends of the several guide members of the assembly are cut away or recessed adjacent the edge of the turret to clear the turret and permit rotation of the turret and operation of jar gripping devices or assemblies indicated at 45 which pick up the jars R from the infeed pusher members 25.

The caps C are supplied to the machine by the cap supplying and feeding mechanism 18 (FIGURES 1 and 2) from a magazine or other supply source (not shown) through a cap feed chute 50 which is supported in upwardly inclined relation by a bracket 51 extending upwardly from a horizontal support or base plate 52 which is connected by suitable brackets to the main post assemblies 15 and 17 and a supplemental vertical post 53 at the one corner of the base 10. The cap feed chute 50 is constructed to provide a guideway 54 for delivering the caps C in a continuous stream to a feed wheel 55 which is mounted in an inclined position at the bottom or delivery end of the chute 50. The feed wheel 55 is supported on the top end of an inclined shaft 59 and is provided with a flange forming portion 57 having peripherally spaced, relatively shallow pockets 58 for receiving caps from the chute 50 and for advancing individual caps, one at a time in regular succession to a transfer wheel 60. The flange 57 is inclined relative to the plane in which the feed wheel turns so that at the lowermost point of travel the flange 57 is parallel with the horizontally disposed base plate 52 and the caps are brought into a horizontal position for pick up by the transfer wheel 60. A guide rail or guideway forming assembly comprising a bottom cap supporting plate 61 and a top cover plate 62 extends from the bottom end of the feed chute 50 to the point of delivery of the caps to the transfer wheel 60, the two plates 61 and 62 being curved to conform to the path of the flange 57 so that the latter advances the caps C between the two guide plates 61 and 62 and seats them in one of the pockets 63 on the transfer wheel 60.

The transfer wheel 60 is mounted on the top end of a vertically disposed drive shaft 64 and rotates in a horizontal plane with the drive shaft 64 being mounted in the housing 65 and connected with the main drive mechanism for the machine so that its rotation of this wheel and the feed wheel 55 is synchronized. The caps are advanced in the pockets of transfer wheel 60 to a make-up point A (FIGURES 2 and 5) where they are delivered beneath one of a plurality of cap applying spindle assemblies 70 (FIGURE 4) carried on the cap applying head 13. The spindle assemblies 70 are moved by rotation of the head 13 to a make-up point B where each successive spindle assembly 70 is in vertical alignment with a jar R which has been advanced by the infeed conveyor 12 into position on the turret 11. The pitch line 60' of the transfer wheel 60 and the pitch line 70' of the spindle assemblies 70 on the capping head 13 pass through the make-up point A where each successive cap C is picked up by a spindle assembly 70 and held on the bottom end of the assembly by magnetic attraction so that the caps advance from the feed wheel 60 along a circular path with the head 13, the transfer of the caps from the wheel 60 occurring at the make-up point A which is in a vertical plane passing through the vertical axes of the wheel 60 and the supporting shaft for the head 13.

The jar supporting and clamping turret 11 is supported for rotation about a vertical axis and includes jar supporting assemblies constituting a series of peripherally spaced work stations each having a jar supporting plate or platen 81 which is spring backed and on which a jar R is received and clamped in position in proper vertical alignment beneath a spindle assembly 70 by associated jar gripping devices indicated at 45. The jar gripping devices each comprise the fixed clamp arm 115 (FIGURE 3) and a movable clamp arm 116 with suitable pads for gripping the side wall of the jar and holding it in fixed position on the platen 81. As the jar R moves onto platen 81 on the jar supporting turret 11, the cap C is delivered by the transfer wheel 60 to the make-up point A where it is picked up by an oncoming spindle assembly 70 on the cap applying head 13 which is supported for rotation above the jar supporting turret 11 with each spindle assembly vertically aligned with a jar supporting platen so that the jar R, when properly positioned on the platen 81, is axially aligned with the axis of rotation of the spindle assembly 70 on the head 13.

The spindle assemblies 70 are mounted in peripherally spaced relation on a spindle supporting housing 130 (FIGURE 1) which is of generally cylindrical shape and which is suspended in rotatable relation with the top drive housing 14. The housing 130 carries spindle assemblies 70 and co-operating mechanism for rotating the spindles. Each spindle assembly 70 is mounted in the housing 130 for vertical movement and there is a cam mechanism mounted on the top housing 14 for controlling such movement so as to raise and lower the spindles, this mechanism and its operation being fully described in application Ser. No. 253,895, now Patent No. 3,253,388. Each spindle assembly 70 comprises an inner spindle shaft and an outer spindle shaft with associated drive mechanism for rotating the inner shaft at a slower speed in timed relation to the rotation of the turret. The spindle shafts have relative axial movement in the vertical direction. The inner spindle carries on its bottom end or pick up head 212 a magnet for gripping a cap moved beneath the same so as to hold the cap while it is rapidly turned or spun down on the mouth of the jar to a position for tightening thereon. The outer spindle carries on its bottom end 220 a cap gripping pad 221 which engages the cap top and turns the same into sealing position while the turret rotates and the jar with the cap thereon travels with the turret. The spindle carrying head 13 is adjusted vertically to position the bottom end of each spindle assembly 70 at the proper elevation so as to place the cap C on the jar which has been moved into proper position on the platen 81 shortly after the cap has been picked up by the cap pickup head. The cap C is placed on the jar mouth initially by downward movement of the entire spindle assembly. The inner high speed spindle shaft, which has been lowered, picks up the cap and seats the cap snugly on the jar R as the entire spindle assembly continues a downward movement sustaining the relative location between the inner spindle pickup head 212 and the outer spindle cap engaging pad 221. These operations occur as the jar R is being advanced by the infeed conveyor 12 and picked up by the fixed gripping arm member 115 on the rotating turret 11 where the jar is located between the fixed arm member 115 on the one side and the pusher member 25 on the other side so that the jar is moving in a straight line while the cap is being applied. As the turret 11 and head 13 continue to rotate in the same direction the jar R is clamped between the clamping arms 115 and 116 causing it to leave its straight line path as the cap engaging pad 221 on the bottom end of the outer spindle is seated on the cap C forcing the cap and jar downwardly on the platen 81 against the spring pressure beneath the platen. The cap C is then rotated at slow speed by rotation of the outer spindle shaft to tighten the cap on the jar mouth. After the cap has been sufficiently tightened the spindle assembly 70 is raised, when the capped jar reaches the discharge mechanism 20, to release the capped jar for discharge from the turret 11 and subsequent removal from the machine.

A steam chamber assembly 315 is mounted above the infeed conveyor 12 in the area approaching the cap and jar assembling or make-up point B, which is constructed to provide a downwardly opening passageway 316 for the tops of the jars on the infeed conveyor 12 which extends from the edge of the machine to the make-up point B. The passageway 316 is defined adjacent the make-up point B by laterally spaced side sections 318 and 319 of the steam chamber assembly 315. A drag bar device 350 is mounted in an inwardly opening slot 351 in the forward inner end of the steam chamber section 318. The drag bar device 350 comprises a holder 352 of generally L shape and a facing pad 353 secured on the inner face thereof. The holder 352 is mounted on a vertical pivot 354 extending through the slot 351 at the forward end thereof and is urged in a clockwise direction by a compression spring 355 seated at one end against the inner wall of the slot 351 and at the other end in a socket 356 provided in the holder 352. The free end of the holder 352 has a tail portion 357 which extends into a pocket 358 at the trailing end of the slot 351 so as to limit the rotative movement of the holder 352 in the clockwise direction as viewed in FIGURE 7. The facing strip 353 may be of rubber or any similar material which will exert a drag on the cap side wall. The drag bar device 350 is mounted at the proper elevation for engaging the side wall of a cap carried on a spindle assembly 70 and in normally fully spun down relationship on a jar as the latter advances beyond the make-up point B and it extends into the path of the cap a sufficient distance to insure engagement therewith. The inner face of the device 350 is at an angle relative to the face of the supporting member 318 so that the cap skirt will pass clear of the trailing end and engage the angled surface which will frictionally rotate the cap if it is not already fully spun down in the direction of rotation of the spindle assembly 70 so as to insure that the cap will subsequently be fully spun down as it is subsequently lowered and turned by the lowering of the spindle assembly 70 and avoid any crushing which might otherwise occur through failure of the cap to turn with the spindle.

I claim:

1. A machine for applying caps to jar-like containers, comprising feed conveyor means for advancing successive containers to be capped to a container and cap assembly station, cap feeding and transfer means for advancing successive caps to said assembly station in timed relation to the advance of the containers, a turret disposed at one side of said container feed conveyor and carrying a plurality of container supporting platforms in a path which intersects the path of the feed conveyor so that containers are delivered to the supporting platforms on the turret while they are advanced by the feed conveyor, means for gripping and holding the containers on the platforms, a capping head mounted for rotation above said turret, said capping head having a plurality of rotatably mounted, vertically reciprocating spindle assemblies spaced around the periphery thereof in vertical alignment with the container supporting platforms for placing a cap on each successive container, each said spindle assembly having a member on the lower end positioned to pick up a cap delivered to said assembly station and to releasably hold the cap while it is lowered and rapidly turned onto the mouth of a container, and a friction drag device mounted adjacent said cap assembly station for engagement by each successive cap at a point where the cap is normally already spun down on a container so as to cause any cap not fully spun down on a container to rotate in the direction to turn it on the container.

2. A machine for applying caps as recited in claim 1 and said friction drag device including a pivotally mounted arm having a friction pad on the face thereof which extends into the path of the caps at a point where the caps are already normally spun down on the containers and is located so that any cap not fully spun down on a container is rotated by engagement therewith in the direction to turn it on the container as it is advanced by said cap feeding and transfer means.

3. A machine for applying caps as recited in claim 1, and said friction drag device including a support arm pivotally mounted so as to swing into the path of the rim of a cap at a point where the cap is already normally spun down on the container and as the cap is advanced through the cap assembly station, a friction pad on the cap engaging face thereof, and spring means urging said arm toward the path of the caps so that each cap is engaged thereby and any balky cap is rotated by the friction pad in the direction to turn it on the container and is subsequently fully spun down on the container by the spindle assembly.

4. A machine for applying caps to jar-like containers, comprising straight line conveyor means for advancing successive containers to be capped to a container and cap assembly station, cap feeding and transfer means for advancing successive caps to said assembly station, a turret conveyor disposed at one side of said straight line conveyor and carrying a plurality of container supporting platforms in a path which intersects the path of the straight line conveyor at two spaced points so that containers are delivered to the supporting platforms while they are advanced by the straight line conveyor along a chordal path relative to the path of the supporting platforms, said turret conveyor having means for gripping and holding the containers on the platforms, a capping head mounted for rotation above said turret conveyor and on an axis coinciding with the axis of rotation thereof, said capping head having a plurality of rotatable spindle assemblies spaced around the periphery thereof in vertical alignment with the container supporting platforms for placing a cap on each successive container, each said spindle assembly having axially aligned inner and outer spindles which are mounted for movement in a vertical direction relative to each other, the inner spindle having a member on the lower end positioned to engage a cap delivered to said assembly station and to releasably hold the cap above a container, said spindle assemblies being adapted to be raised and lowered and to be rotated in timed relation to the movement of the turret conveyor so as to position a cap on a container an rapidly turn it down while the container moves in a straight line along said chordal path and thereafter turn said cap tight on the top of said container while the container is carried in a circular path on said turret, and a friction drag member mounted adjacent the cap assembly station for engaging each successive cap so as to cause any cap not already fully spun down on a container mouth to rotate in the same direction as the rotation of the spindle assemblies.

5. A capping machine for applying caps to the threaded mouths of jar-like containers, comprising a container supporting turret mounted for rotation about a vertical axis, a cap applying head supported above said turret for rotation on a vertical axis aligned with the vertical axis of the turret, said cap applying head having a plurality of vertically disposed, rotatable spindle assemblies mounted for vertical movement in said head, conveyor means for delivering successive containers onto the container supporting turret so that each container is vertically aligned beneath a spindle assembly, means for feeding successive caps to the spindle assemblies in timed relation to the movement of the containers so as to align the caps vertically above successive containers at a predetermined assembly point, said spindle assemblies each having means for releasably gripping a cap so that it rotates therewith and is turned on a container when the spindle assembly is lowered, and a friction drag mounted in the path of the caps adjacent the assembly point for engaging each successive cap to initiate the turning of any balky caps not already fully spun down on the containers in the direction of rotation of the spindle assembly.

6. In a machine for applying caps to jar-like containers, straight line conveyor means for advancing successive containers to be capped to a container and cap assembly station, cap feeding and transfer means for advancing successive caps to said assembly station, a turret disposed at one side of said straight line conveyor and carrying a plurality of container supporting means in a path which intersects the path of the straight line conveyor so that containers are moved onto the supporting means while they are advanced by the conveyor, means on the turret for gripping and holding a jar thereon, a capping head mounted for rotation above said turret on an axis coinciding with the axis of rotation of said turret, said capping head having a plurality of vertically reciprocating, rotating spindle assemblies spaced around the periphery thereof with their axes disposed to travel in a path aligned above the path of travel of the axes of containers on the turret, each said spindle assembly having a cap receiving member on the lower end adapted to engage a cap delivered to said assembly station so as to advance the cap above a container on the turret beneath said spindle assembly and to rapidly turn said cap on the container as said spindle assembly is lowered, and a friction drag member disposed at said cap assembly station which is positioned for engaging the periphery of each cap at a point where the cap is normally already fully spun down on a container so as to impart rotation to any balky caps which were not properly fully spun down on the containers.

7. In a machine for applying caps to jar-like containers wherein the containers are delivered by a straight line conveyor to a cap and container assembly station where the container is positioned on a supporting turret having circumferentially spaced container platforms and an overhead turret structure having rotating cap receiving and applying devices which are aligned vertically with the container platforms, means associated with the straight line conveyor for guiding the same in a path to advance the containers to the assembly station, cap feeding and transfer means for advancing successive caps to said assembly station where they are picked up by said cap receiving and applying devices for application to the containers and a drag bar mounted on a support along the path of the caps and extending into said path for engaging successive caps and causing any balky caps not already fully spun down on a container mouth to rotate so that they will subsequently be fully spun down by the said cap receiving and applying devices.

8. In a machine as recited in claim 7, and said drag bar being mounted so that the caps pass between the same and said turret structure whereby the caps are caused to rotate in a direction to turn them down on the containers.

9. In a machine as recited in claim 7, and said drag bar being on a resiliently mounted support which normally holds the same in a position for engagement by the caps.

10. In a machine for applying caps to jar-like containers, wherein successive containers are advanced by straight line conveyor means to a container and cap assembly station adjacent a rotating turret disposed at one side of said conveyor means and which has a plurality of container supporting platforms moving in a path which intersects the path of the conveyor means so that containers are moved from said conveyor means onto the supporting platform by advance of the conveyor means, the turret having an associated capping head mounted for rotation on an axis coinciding with the axis of rotation of said turret which capping head has a plurality of cap receiving and applying members adapted to engage successive caps delivered to said assembly station and to advance each cap above a container on the turret for assembly with the container, a friction drag member mounted at said cap assembly station in position for engaging the periphery of each cap at a point where the caps are normally already fully spun down on the containers so as to impart rotation to any balky caps not already fully spun down on the containers by the cap receiving and applying member.

References Cited

UNITED STATES PATENTS

| 2,819,516 | 1/1958 | Myers | 53—317 X |
| 3,071,909 | 1/1963 | Elleman | 53—315 |

TRAVIS S. McGEHEE, *Primary Examiner.*

R. L. FARRIS, *Assistant Examiner.*